US012512269B2

(12) United States Patent
Son et al.

(10) Patent No.: US 12,512,269 B2
(45) Date of Patent: Dec. 30, 2025

(54) MULTILAYER ELECTRONIC COMPONENT

(71) Applicant: SAMSUNG ELECTRO-MECHANICS CO., LTD., Suwon-si (KR)

(72) Inventors: Won Su Son, Suwon-si (KR); Ki Pyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 476 days.

(21) Appl. No.: 18/074,780

(22) Filed: Dec. 5, 2022

(65) Prior Publication Data

US 2023/0207218 A1 Jun. 29, 2023

(30) Foreign Application Priority Data

Dec. 29, 2021 (KR) ........................ 10-2021-0190535

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/12* (2013.01); *H01G 4/232* (2013.01)

(58) Field of Classification Search
CPC .......... H01G 4/232; H01G 4/12; H01G 4/012; H01G 4/30
See application file for complete search history.

(56) References Cited

U.S. PATENT DOCUMENTS

2013/0050893 A1\* 2/2013 Kim .................... H01G 4/12
361/306.3
2014/0160621 A1\* 6/2014 Yoon .................. H01G 4/12
29/25.42
(Continued)

FOREIGN PATENT DOCUMENTS

JP H10-154632 A 6/1998
JP 2003022932 A \* 1/2003 ............. H01G 4/232
(Continued)

OTHER PUBLICATIONS

Korean Office Action dated Jun. 2, 2025 issued in Korean Patent Application No. 10-2021-0190535 (with English translation).

*Primary Examiner* — David M Sinclair
(74) *Attorney, Agent, or Firm* — Morgan Lewis & Bockius LLP (57) ABSTRACT

A multilayer electronic component includes: a body including a dielectric layer and first and second internal electrodes stacked in a third direction, and including first and second surfaces in a first direction, and third and fourth surfaces in a second direction; first external electrodes respectively disposed on the first and second surfaces, extended onto the third and fourth surfaces; and second external electrodes respectively disposed on the third and fourth surfaces. The first internal electrode includes a first main portion and first lead portions respectively extended from the first main portion, connected to the first external electrodes, and having a length increased in a direction towards the first main portion, and the second internal electrode includes a second main portion and second lead portions respectively extended from the second main portion, connected to the second external electrodes, and having a length increased in a direction towards the second main portion.

23 Claims, 5 Drawing Sheets

(51) Int. Cl.
*H01G 4/12* (2006.01)
*H01G 4/232* (2006.01)

(56) References Cited

U.S. PATENT DOCUMENTS

| | | | | |
|---|---|---|---|---|
| 2015/0014040 | A1* | 1/2015 | Ahn | H05K 1/181 |
| | | | | 361/301.4 |
| 2015/0114702 | A1* | 4/2015 | Lee | H01G 4/012 |
| | | | | 361/301.4 |
| 2018/0350521 | A1 | 12/2018 | Oh et al. | |
| 2020/0411237 | A1 | 12/2020 | Kim et al. | |

FOREIGN PATENT DOCUMENTS

| | | | | |
|---|---|---|---|---|
| JP | 2004140211 A | * | 5/2004 | |
| JP | 2005216955 A | * | 8/2005 | ............... H01G 4/12 |
| KR | 10-2014-0038876 A | | 3/2014 | |
| KR | 10-2015-0050519 A | | 5/2015 | |
| KR | 10-2018-0132490 A | | 12/2018 | |
| KR | 10-2019-0116116 A | | 10/2019 | |

* cited by examiner

MULTILAYER ELECTRONIC COMPONENT

CROSS-REFERENCE TO RELATED APPLICATION(S)

This application claims benefit of priority to Korean Patent Application No. 10-2021-0190535 filed on Dec. 29, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an imaging device including a liquid crystal display (LCD) or a plasma display panel (PDP), a computer, a smartphone or a cellular phone, to serve to charge or discharge electricity therein or therefrom.

The multilayer ceramic capacitor (MLCC) is small, has high capacitance, and is easily mounted on a circuit board, and may thus be used as a component of various electronic devices.

Recently used is a three-terminal multilayer ceramic capacitor that lowers equivalent series inductance (ESL) by including a signal electrode and a ground electrode. The three-terminal multilayer ceramic capacitor may have a current path shorter than that of a general multilayer ceramic capacitor, and may thus have a lower ESL value.

However, the three-terminal multilayer ceramic capacitor may be required to include an internal electrode including a lead portion so that the internal electrode is connected to each of the signal electrode and the ground electrode. Accordingly, a step difference may occur due to a difference between a thickness of a region in which the lead portion is formed and a thickness of a margin region in which the lead portion is not formed. As a result, a thickness of a dielectric layer may be locally reduced during a process of compressing a capacitor body, thereby reducing the withstand voltage and reliability of the capacitor.

SUMMARY

An aspect of the present disclosure may provide a multilayer electronic component having lower equivalent series inductance (ESL).

Another aspect of the present disclosure may provide a multilayer electronic component having excellent reliability by suppressing a step difference from occurring in a margin portion.

Another aspect of the present disclosure may provide a multilayer electronic component having excellent capacitance due to an increased area in which the internal electrodes overlap each other.

However, the present disclosure is not limited to the description above, and may be more readily understood in the description of exemplary embodiments of the present disclosure.

According to an aspect of the present disclosure, a multilayer electronic component may include: a body including a dielectric layer and first and second internal electrodes stacked on each other in a third direction of the body, while having the dielectric layer interposed therebetween, and including first and second surfaces opposing each other in a first direction of the body, and third and fourth surfaces opposing each other in a second direction of the body; first external electrodes respectively disposed on the first and second surfaces of the body, extended onto the third and fourth surfaces and connected to the first internal electrode; and second external electrodes respectively disposed on the third and fourth surfaces of the body and connected to the second internal electrode. The first internal electrode may include a first main portion and first lead portions respectively extended from the first main portion in the second direction to be connected to the first external electrodes and having a length in the first direction increased in a direction towards the first main portion, and the second internal electrode may include a second main portion and second lead portions respectively extended from the second main portion in the second direction and a direction opposite to the second direction to be connected to the second external electrodes and having a length in the first direction increased in a direction towards the second main portion.

The first and second lead portions may overlap each other in at least some regions, in the third direction.

At least some regions of the first main portion may not overlap the second main portion in the third direction.

A pair of the first lead portions may be positioned on one side of the first main portion to respectively be connected to the first external electrodes.

One end of at least one of the second lead portions, connected to the second main portion, may have the length in the first direction, substantially the same as the length of the second main portion in the first direction.

The multilayer electronic component may further include first dummy electrodes respectively connected to the second external electrodes and spaced apart from the first external electrodes.

At least one of the first dummy electrodes may be disposed on substantially the same plane as the first internal electrode.

at least one of the first dummy electrodes may have a length in the first direction increased in a direction towards the second external electrode.

The multilayer electronic component may further include second dummy electrodes respectively connected to the first external electrodes and spaced apart from the second external electrodes.

At least one of the second dummy electrodes may be disposed on substantially the same plane as the second internal electrode.

At least one of the second dummy electrodes may have a length in the first direction increased in a direction towards the first external electrode.

The first main portion may extend to the first and second surfaces of the body to be connected to the first external electrodes.

According to another aspect of the present disclosure, a multilayer electronic component may include: a body including a dielectric layer and first and second internal electrodes stacked on each other in a third direction, while having the dielectric layer interposed therebetween, and including first and second surfaces opposing each other in a first direction, and third and fourth surfaces opposing each other in a second direction; first external electrodes respectively disposed on the first and second surfaces of the body, extended onto the third and fourth surfaces and connected to the first internal electrode; and second external electrodes respectively disposed on the third and fourth surfaces of the body and connected to the second internal electrode. The first internal electrode may include a first main portion and first lead portion respectively extended from the first main portion in the second direction to be connected to the first external electrodes, the second internal electrode may include a second main portion and second lead portions respectively extended from the second main portion in the second direction and a direction opposite to the second direction to be connected to the second external electrodes, and the first and second lead portions may overlap each other in at least some regions, in the third direction.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may indicate a length (L) direction, a second direction may indicate a width (W) direction, and a third direction may indicate a thickness (T) direction.

Figure 1:
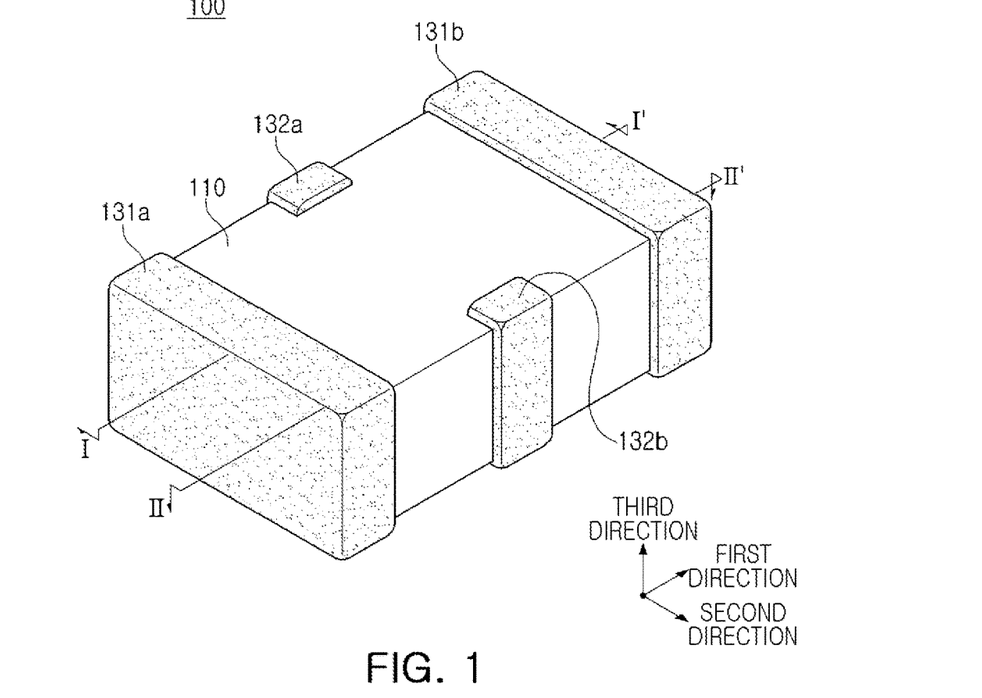
FIG. 1 is a perspective view schematically illustrating a multilayer electronic component according to an exemplary embodiment of the present disclosure.

FIG. 1 is a perspective view schematically illustrating a multilayer electronic component according to an exemplary embodiment of the present disclosure.

Figure 2:
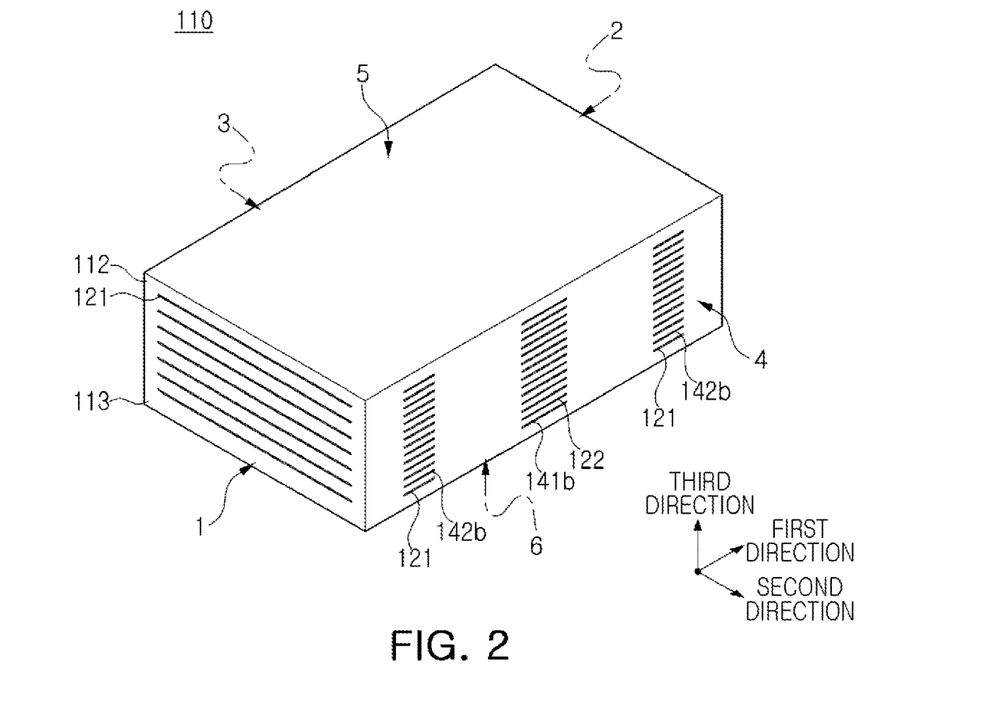
FIG. 2 is a perspective view schematically illustrating a body of the multilayer electronic component.

FIG. 2 is a perspective view schematically illustrating a body of the multilayer electronic component.

Figure 3:
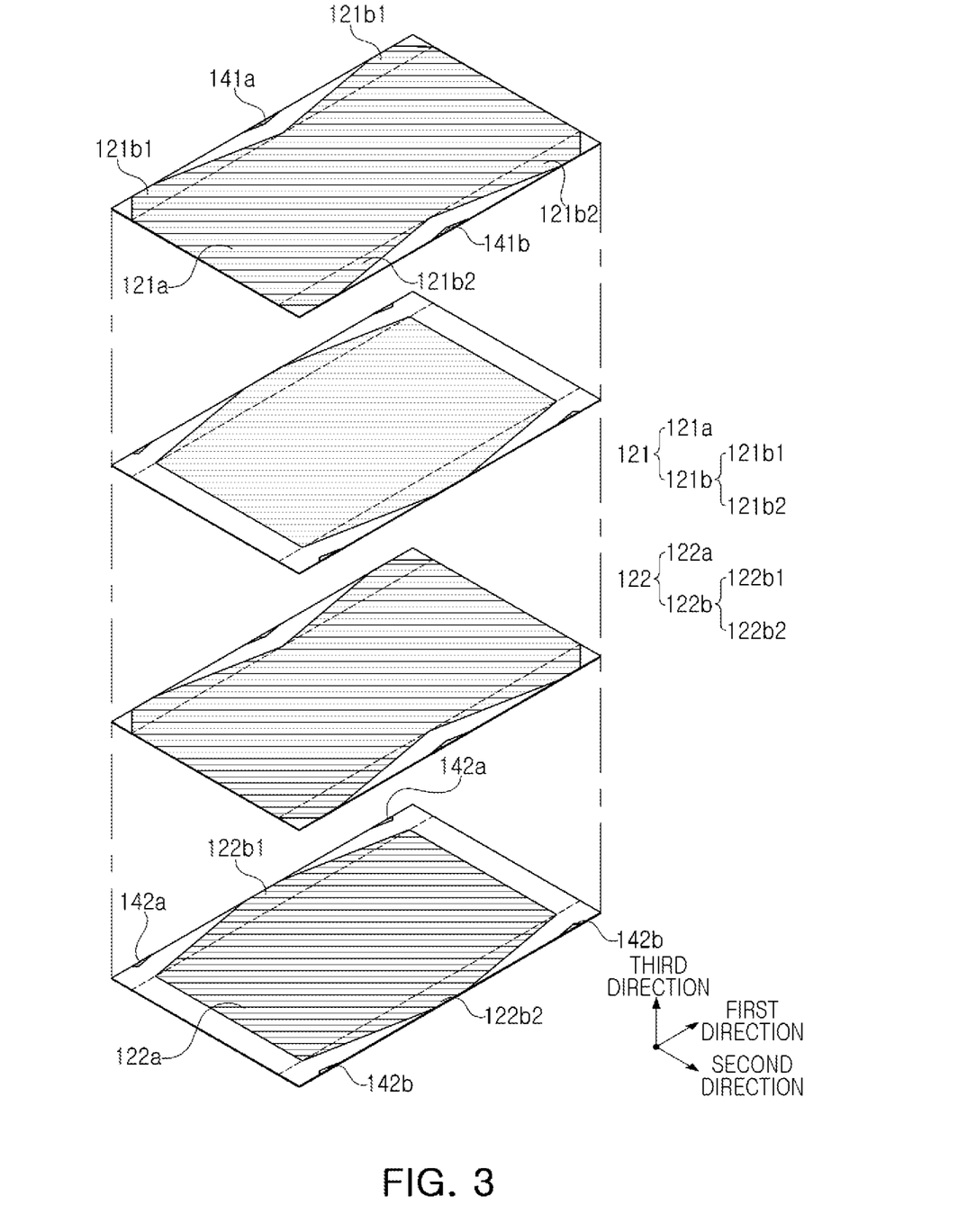
FIG. 3 is an exploded perspective view illustrating a stack structure of a dielectric layer and first and second internal electrodes.

FIG. 3 is an exploded perspective view illustrating a stack structure of a dielectric layer and first and second internal electrodes.

Figure 4:
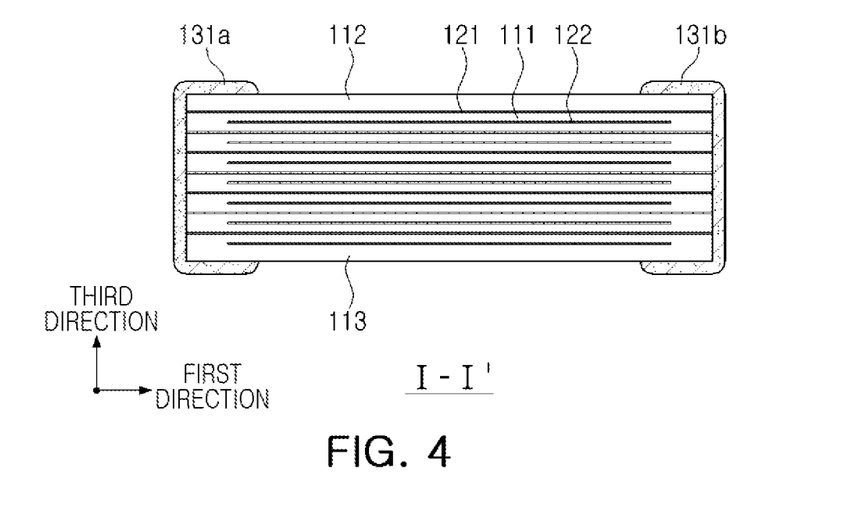
FIG. 4 is a cross-sectional view taken along line I-I' of FIG. 1.

FIG. 4 is a cross-sectional view taken along line I-I'' of FIG. 1.

Figure 5:
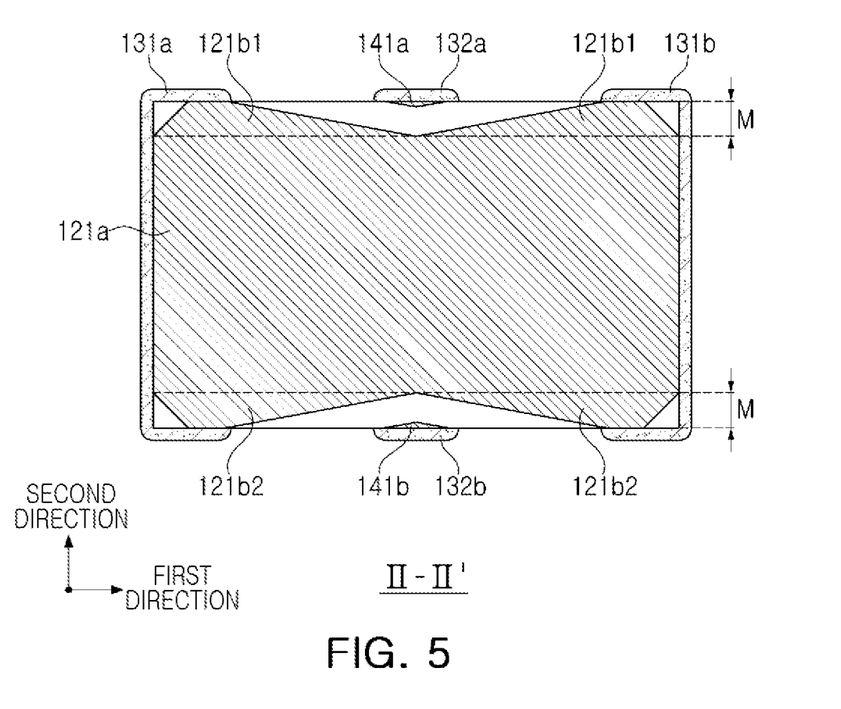
FIG. 5 is a cross-sectional view taken along line II-II' of FIG. 2 and illustrating a cross-section of the body in which a first internal electrode is observed.

FIG. 5 is a cross-sectional view taken along line II-II' of FIG. 2 and illustrating a cross-section of the body in which a first internal electrode is observed.

Figure 6:
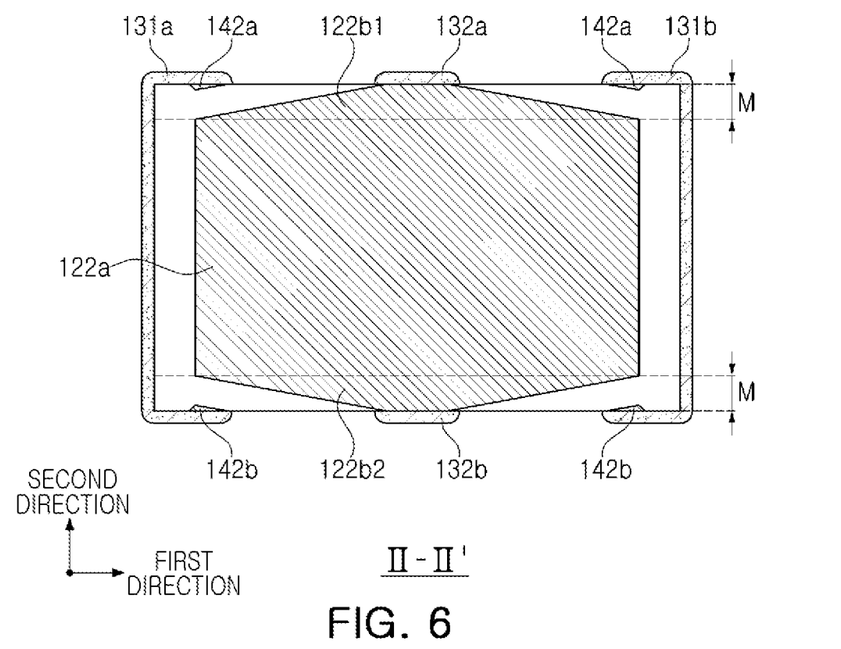
FIG. 6 is a cross-sectional view taken along line II-II' of FIG. 2 and illustrating a cross-section of the body in which a second internal electrode is observed.

FIG. 6 is a cross-sectional view taken along line II-II' of FIG. 2 and illustrating a cross-section of the body in which a second internal electrode is observed.

Figure 7:
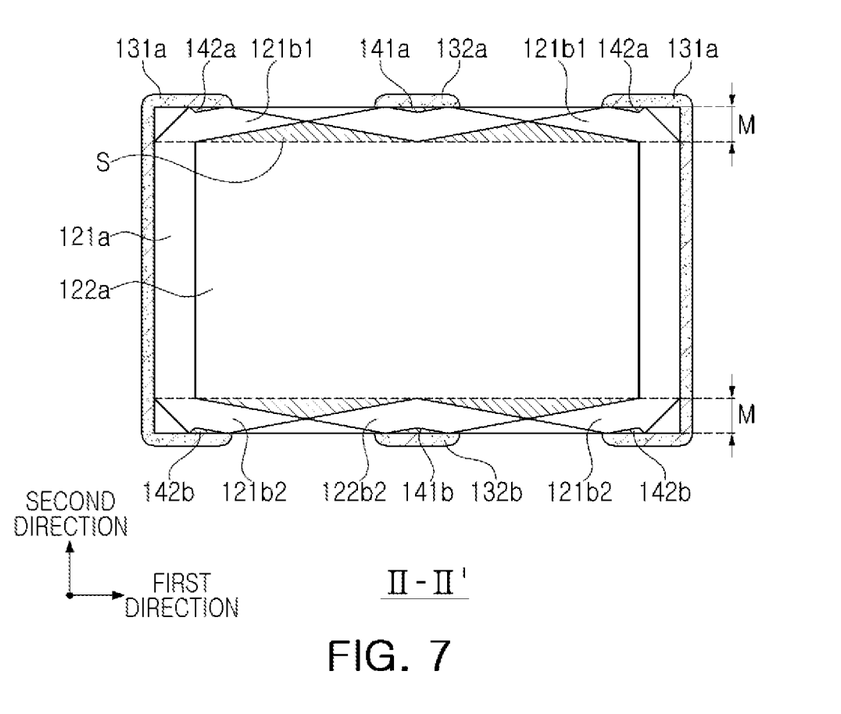
FIG. 7 schematically illustrates a region in which the first internal electrode and the second internal electrodes overlap each other.

FIG. 7 schematically illustrates a region in which the first internal electrode and the second internal electrodes overlap each other.

Referring to FIGS. 1 through 7, a multilayer electronic component 100 according to an exemplary embodiment of the present disclosure may include: a body 110 including dielectric layers 111 and a plurality of first and second internal electrodes 121 and 122 stacked on each other in the third direction, while having the dielectric layer 111 interposed therebetween, and including first and second surfaces 1 and 2 opposing each other in the first direction, and third and fourth surfaces 3 and 4 opposing each other in the second direction; a pair of first external electrodes 131a and 131b respectively disposed on the first and second surfaces 1 and 2 of the body 110, extended onto the third and fourth surfaces 3 and 4 and connected to the first internal electrode 121; and second external electrodes 132a and 132b respectively disposed on the third and fourth surfaces 3 and 4 of the body 110 and connected to the second internal electrode 122. The first internal electrode 121 may include a first main portion 121a and a first lead portion 121b extended from the first main portion 121a in the second direction to be connected to the first external electrodes 131a and 131b and having a length in the first direction increased in a direction towards the first main portion 121a, and the second internal electrode 122 may include a second main portion 122a and a second lead portion 122b extended from the second main portion 122a in the second direction to be connected to the second external electrodes 132a and 132b and having a length in the first direction increased in a direction towards the second main portion 122a.

As described above, a step difference may occur due to a difference between a thickness of a region in which the lead portion of the internal electrode is formed and a thickness of a margin region in which the lead portion is not formed. As a result, a thickness of the dielectric layer may be locally reduced during a process of compressing the body, thereby reducing the withstand voltage and reliability of the capacitor.

On the other hand, the multilayer electronic component 100 according to an exemplary embodiment of the present disclosure may include the first lead portion 121b having the length in the first direction increased in a direction towards the first main portion 121a and the second lead portion 122b having the length in the first direction increased in a direction towards the second main portion 122a to minimize the step difference occurring in a margin portion M, thereby improving its reliability.

Hereinafter, the description more specifically describes each component included in the multilayer electronic component 100 according to an exemplary embodiment of the present disclosure.

The body 110 is not limited to a particular shape, and may have a hexahedral shape or a shape similar to the hexahedral shape, as shown in the drawings. The body 110 may not have a shape of the hexahedron having perfectly straight lines because a ceramic powder included in the body 110 is contracted or its edge is polished in a process in which the body is sintered. However, the body 110 may substantially have the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4, and opposing each other in the third direction. Here, the first direction may indicate a direction perpendicular to the third direction, a stacking direction of the internal electrode 121 or 122, and the second direction may indicate a direction perpendicular to the first direction and the third direction.

The body 110 may include the dielectric layer 111 and the internal electrode 121 or 122, which are alternately stacked on each other. The plurality of dielectric layers 111 included in the body 110 may already be sintered, and adjacent dielectric layers 111 may thus be integrated with each other, thus making it difficult to confirm a boundary therebetween without using the scanning electron microscope (SEM).

The dielectric layer 111 may be formed by sintering a ceramic green sheet including a ceramic powder, an organic solvent and a binder. The ceramic powder is not particularly limited as long as the capacitor obtains sufficient capacitance, and may use, for example, a barium titanate ($BaTiO_3$)-based material, a strontium titanate ($SrTiO_3$)-based material or the like. However, the present disclosure is not limited thereto.

Here, a thickness of the dielectric layer 111 may be 10 μm or less in consideration of the size and capacitance of the body 110, and may be 0.6 μm or less, or 0.4 μm or less in order for the multilayer electronic component 100 to have a smaller size and higher capacitance. However, the present disclosure is not limited thereto.

Here, the thickness of the dielectric layer 111 may indicate an average thickness of the dielectric layers 111 disposed between the internal electrodes 121 and 122. The thickness of the dielectric layer 111 may be measured by scanning a cross section of the body 110 in a first-third direction by using a scanning electron microscope with a magnification of 10,000. In more detail, an average thickness value of the dielectric layer 111 may be obtained by averaging the thicknesses of one dielectric layer measured at a plurality of points, for example, at thirty equally spaced points in the first direction. In addition, it is possible to obtain the more general average thickness of the dielectric layer 111 when measuring its average value by extending a measurement target of the average value to the plurality of dielectric layers 111. Other measurement methods and/or tools appreciated by one of ordinary skill in the art, even if not described in the present disclosure, may also be used.

The body 110 may include a capacitance formation portion disposed in the body 110, and forming the capacitance of the capacitor by including the plurality of first and second internal electrodes 121 and 122 disposed to oppose each other interposing the dielectric layer 111 therebetween, and a first cover portion 112 disposed on an upper surface of the capacitance formation portion and a second cover portion 113 disposed on a lower surface of the capacitance formation portion. The first cover portion 112 and the second cover portion 113 may respectively be formed by stacking one dielectric layer or two or more dielectric layers on the upper and lower surfaces of a capacitance formation portion Ac in the third direction, and may basically serve to prevent damage to the internal electrodes, caused by physical or chemical stress. The first and second cover portion 112 or 113 may have the same configuration as the dielectric layer 111 except that the cover portion does not include the internal electrode. The first and second cover portions 112 and 113 may each have a thickness of 20 μm or less. However, the present disclosure is not limited thereto.

The internal electrode 121 or 122 may be alternately disposed with the dielectric layer 111, and the plurality of first internal electrodes 121 and the plurality of second internal electrodes 122 may be disposed to oppose each other interposing the dielectric layer 111 therebetween. The plurality of first internal electrodes 121 and the plurality of second internal electrodes 122 may be electrically insulated from each other by the dielectric layer 111 interposed therebetween. The plurality of first internal electrodes 121 and the plurality of second internal electrodes 122 may be alternately stacked on each other in the third direction, although not limited thereto, and may be alternately stacked on each other in the second direction.

The first internal electrode 121 may include the first main portion 121*a*. The first main portion 121*a* may have a shape of a flat plate perpendicular to the third direction, the stacking direction. Here, the first main portion 121*a* may be connected to the first external electrode 131*a* or 131*b* on the first or second surface 1 or 2 of the body 110. The second internal electrode 122 may include the second main portion 122*a*. The second main portion 122*a* may have the shape of a flat plate perpendicular to the third direction, the stacking direction. Here, the second main portion 122*a* may be spaced apart from the first and second surfaces 1 and 2 of the body 110.

The capacitance of the multilayer electronic component 100 may be formed by an area of a region in which the first main portion 121*a* and the second main portion 122*a* overlap each other in the third direction. The first main portion 121*a* may be connected to the first external electrodes 131*a* and 131*b* on the first and second surfaces 1 and 2 of the body 110, and the second main portion 122*a* may be spaced apart from the first and second surfaces 1 and 2 of the body 110, and therefore, at least some regions of the first main portion 121*a* may not overlap the second main portion 122*a* in the third direction.

The first internal electrode 121 may include the first lead portion 121*b* extended from the first main portion 121*a* in the second direction to be connected to the first external electrodes 131*a* and 131*b*, and having the length in the first direction increased in a direction towards the first main portion 121*a*. The pair of first lead portions 121*b* may be positioned on one side of the first main portion 121*a* to respectively be connected to the pair of first external electrodes 131*a* and 131*b*. For example, a pair of first-A lead portions 121*b*1 positioned on one side of the main portion 121*a*, adjacent to the third surface 3 of the body 110, may respectively be connected to the pair of external electrodes 131*a* and 131*b* on the third surface 3 of the body 110. For example, a pair of first-B lead portions 121*b*2 positioned on the other side of the main portion 121*a*, adjacent to the fourth surface 4 of the body 110, may respectively be connected to the pair of external electrodes 131*a* and 131*b* on the fourth surface 4 of the body 110.

The first lead portion 121*b* may have the length in the first direction increased in a direction towards the first main portion 121*a* to minimize the region in which the first internal electrode 121 is not formed in the margin portion M. In this manner, it is possible to prevent the dielectric layer 111 from having the thickness reduced due to the step difference occurring in the process of compressing the body, thereby improving the withstand voltage characteristic and reliability of the multilayer electronic component 100. In addition, the first lead portion 121*b* may have the length reduced in the first direction as being closer to the first external electrodes 131*a* and 131*b* to be connected to the first external electrodes 131*a* and 131*b* and to be spaced apart from the second external electrodes 132*a* and 132*b*. Here, the margin portion M may indicate each region between both ends of the first and second main portions 121*a* and 122*a* respectively connected to the first and second lead portions 121*b* and 122*b* and a boundary surface of the body 110, based on a cross section of the body 110 in a first-second direction.

Here, a sum of the lengths of the pair of first-A lead portion 121*b*1, positioned on one side of the first main portion 121*a*, in the first direction may be substantially the same as a length of the first main portion 121*a* in the first direction, and a sum of the lengths of the pair of first-B lead portions 121*b*2, positioned on the other side of the first main portion 121*a*, in the first direction may be substantially the same as a length of the first main portion 121*a* in the first direction. An expression including the term "substantially" or the like may have the same meaning as an expression without "substantially" or the like, and may also indicate that a non-ideal situation due to, for example, a process error occurring in the manufacturing process, a positional deviation, a measurement error, or the like has been taken into consideration.

The second internal electrode 122 may include the second lead portion 122*b* extended from the second main portion 122*a* in the second direction to be connected to the second external electrodes 132*a* and 132*b*, and having the length in the first direction increased in a direction towards the second main portion 122*a*. For example, the second lead portion 122*b* may include a second-A lead portion 122*b*1 connected to the second-A external electrode 132*a* on the third surface 3, and a second-B lead portion 122*b*2 connected to the second-B external electrode 132*b* on the fourth surface 4 of the body 110.

The second lead portion 122*b* may have the length in the first direction increased in a direction towards the second main portion 122*a* to minimize the region in which the second internal electrode 122 is not formed in the margin portion M. In this manner, it is possible to prevent the dielectric layer 111 from having the thickness reduced due to the step difference occurring in the process of compressing the body, thereby improving the withstand voltage characteristic and reliability of the multilayer electronic component 100. In addition, the second lead portion 122*b* may have the length reduced in the first direction as being closer to the second external electrodes 132*a* and 132*b* to be spaced apart from the first external electrodes 131*a* and 131*b* and connected to the second external electrodes 132*a* and 132*b*. Here, one end of the second lead portion 122*b*, connected to the second main portion 122*a*, may have a length in the first direction, substantially the same as a length of the second main portion 122*a* in the first direction.

The first lead portion 121*b* and the second lead portion 122*b* may overlap each other in a third direction in at least some regions. For example, the first-A lead portion 121*b*1 and the second-A lead portion 122*b*1 may overlap each other in at least some regions S in the third direction. In addition, the first-B lead portion 121*b*2 and the second-B lead portion 122*b*2 may overlap each other in the at least some regions S in the third direction. Accordingly, not only the step difference may be suppressed but also the capacitance of the multilayer electronic component 100 may be formed by each area of the regions S where the first lead portion 121*b* and the second lead portion 122*b* overlap each other in the third direction. It is thus possible to maximize the capacitance formation in the body 110 of the same size.

The internal electrode 121 or 122 may be formed by printing, on the ceramic green sheet, a conductive paste for an internal electrode including a conductive metal to a predetermined thickness. The capacitance formation portion of the body 110 may be formed by alternately stacking the ceramic green sheets on each of which the internal electrode 121 or 122 is printed on each other and sintering the same. A method of printing the conductive paste for an internal electrode may be a screen printing method, a gravure printing method or the like, and is not limited thereto.

The conductive metal included in the internal electrode 121 or 122 may be at least one of nickel (Ni), copper (Cu), palladium (Pd), silver (Ag), gold (Au), platinum (Pt), tin (Sn), tungsten (W), titanium (Ti) and an alloy thereof. However, the present disclosure is not limited thereto.

Here, a thickness of the internal electrode 121 or 122 may be 10 μm or less in consideration of the size and capacitance of the body 110, and may be 0.6 μm or less, or 0.4 μm or less in order for the multilayer electronic component 100 to have the smaller size and the higher capacitance. However, the present disclosure is not limited thereto. Here, the thickness of the internal electrode 121 or 122 may indicate an average thickness of the internal electrode 121 or 122. The thickness of the internal electrode 121 or 122 may be measured by scanning the cross section of the body 110 in the first-third direction by using the scanning electron microscope with a magnification of 10,000. In more detail, an average thickness value of the internal electrode may be obtained by averaging the thicknesses of one internal electrode measured at a plurality of points, for example, at thirty equally spaced points in the first direction. It is possible to obtain the more general average thickness of the internal electrode when measuring its average value by extending a measurement target of the average value to the plurality of internal electrodes.

The pair of first external electrodes 131*a* and 131*b* may respectively be disposed on the first and second surfaces 1 and 2 of the body 110, extended onto the third and fourth surfaces 3 and 4 of the body 110, and connected to the first internal electrode 121. In more detail, the first-A external electrode 131*a* may be disposed on the first surface 1 of the body 110 to be connected to the first main portion 121*a* of the first internal electrode 121, and connected to the first lead portion 121*b* of the first internal electrode 121 on the third and fourth surfaces 3 and 4 of the body 110. In addition, the first-B external electrode 131*b* may be disposed on the second surface 2 of the body 110 to be connected to the first main portion 121*a* of the first internal electrode 121, and connected to the first lead portion 121*b* of the first internal electrode 121 on the third and fourth surfaces 3 and 4 of the body 110. In addition, the pair of first external electrodes 131*a* and 131*b* may be extended onto the fifth and sixth surfaces 5 and 6 of the body 110.

The second external electrodes 132*a* and 132*b* may respectively be disposed on the third and fourth surfaces 3 and 4 of the body 110, and connected to the second internal electrode 122. The second external electrodes 132*a* and 132*b* may be spaced apart from the first external electrodes 131*a* and 131*b*, and disposed between the pair of first external electrodes 131*a* and 131*b*. In addition, the pair of second external electrodes 132*a* and 132*b* may be extended onto a portion of each of the fifth and sixth surfaces 5 and 6 of the body 110.

In more detail, the second-A external electrode 132*a* may be disposed on the third surface 3 of the body 110, and connected to the second-A lead portion 122*b*1 of the second internal electrode 122. In addition, the second-B external electrode 132*b* may be disposed on the fourth surface 4 of the body 110, and connected to the second-B lead portion 122*b*2 of the second internal electrode 122. The second-A and second-B external electrodes 132*a* and 132*b* may respectively be disposed on the third and fourth surfaces 3 and 4 of the body 110, and formed as the pair of electrodes spaced apart from each other. Alternatively, the second-A and second-B external electrodes 132a and 132b may be extended onto the sixth surface 6 of the body 110 and connected to each other, thus surrounding the body 110.

The pair of first external electrodes 131a and 131b may be signal electrodes, and the second external electrodes 132a and 132b may be ground electrodes. As such, it is possible to lower equivalent series inductance (ESL) by forming all the external electrodes in a terminal type.

The first external electrode 131a or 131b or the first external electrode 132a or 132b may be made of any material having electrical conductivity, such as a metal, may use a specific material determined in consideration of electrical characteristics, structural stability or the like, and may have a multilayer structure. For example, the first external electrode 131a or 131b or the second external electrode 132a or 132b may include the conductive metal, the conductive metal included in the first external electrode 131a or 131b or the second external electrode 132a or 132b may include copper (Cu), nickel (Ni), palladium (Pd), platinum (Pt), gold (Au), silver (Ag), lead (Pb) and/or an alloy thereof, may include copper (Cu) and/or nickel (Ni), and may not be limited thereto.

A method of forming the first external electrode 131a or 131b or the second external electrode 132a or 132b is not particularly limited, and may be formed by dipping the body 110 in a conductive paste for an external electrode including the conductive metal and glass and then sintering the same. The external electrode may also be formed by transferring a sheet including the conductive metal and glass or by using another method such as plating, deposition or the like.

Here, the multilayer electronic component 100 may further include first dummy electrodes 141a and 141b connected to the second external electrodes 132a and 132b and spaced apart from the first external electrodes 131a and 131b. In one example, the first dummy electrodes 141a and 141b and the first internal electrode 121 may be disposed on the same dielectric layer. For example, the first-A dummy electrode 141a may be connected to the second-A external electrode 132a on the third surface 3 of the body 110. In addition, the first-B dummy electrode 141b may be connected to the second-B external electrode 132b on the fourth surface 4 of the body 110. It is possible to improve the moisture resistance reliability and lifespan of the multilayer electronic component 100 by including the first dummy electrodes 141a and 141b, and to improve the withstand voltage characteristic of the multilayer electronic component 100 by suppressing the step difference occurring in the margin portion M.

The first dummy electrode 141a or 141b may be disposed on substantially the same plane as the first internal electrode 121. The reason is that, as described below, the first dummy electrodes 141a and 141b are formed by stacking and then cutting the plurality of ceramic green sheets.

In addition, the first dummy electrode 141a or 141b may have a length in the first direction increased in a direction towards the second external electrode 132a or 132b. Accordingly, it is possible to prevent the first internal electrode 121 from being in contact with the first lead portion 121b while improving the reliability of the multilayer electronic component 100 by suppressing the step difference occurring in the margin portion M.

In addition, the multilayer electronic component 100 may further include second dummy electrodes 142a and 142b connected to the first external electrodes 131a and 131b and spaced apart from the second external electrodes 132a and 132b. In one example, the second dummy electrodes 142a and 142b and the second internal electrode 122 may be disposed on the same dielectric layer. For example, the pair of second-A dummy electrodes 142a may be positioned in the margin portion M to respectively be connected to the first-A external electrode 131a and the first-B external electrode 131b on the third surface 3 of the body 110. In addition, the pair of second-B dummy electrodes 142b may be positioned in the margin portion M to respectively be connected to the first-A external electrode 131a and the first-B external electrode 131b on the fourth surface 4 of the body 110. It is thus possible to improve the moisture resistance reliability and lifespan of the multilayer electronic component 100, and to improve the withstand voltage characteristic of the multilayer electronic component 100 by suppressing the step difference occurring in the margin portion M.

The second dummy electrode 142a or 142b may be disposed on substantially the same plane as the second internal electrode 122. The reason is that, as described below, the second dummy electrodes 142a and 142b are formed by stacking and then cutting the plurality of ceramic green sheets.

In addition, the second dummy electrode 142a or 142b may have a length in the first direction increased in a direction towards the first external electrode 131a or 131b. Accordingly, it is possible to prevent the second internal electrode 122 from being in contact with second lead portion 122b while improving the reliability of the multilayer electronic component 100 by suppressing the step difference occurring in the margin portion M.

Figure 8:
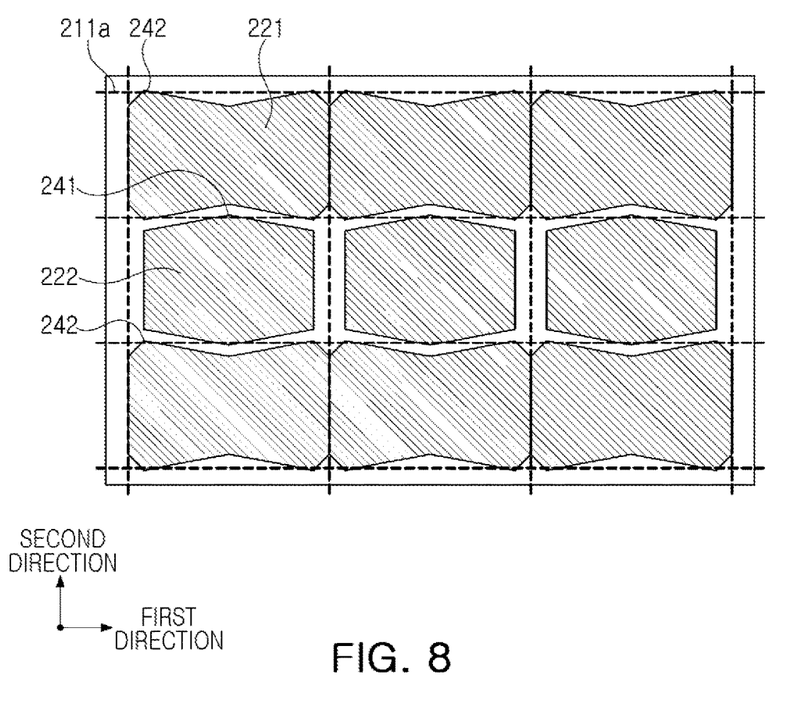
FIG. 8 schematically illustrates a first ceramic green sheet on which first or second internal electrode pattern is formed.

FIG. 8 schematically illustrates a first ceramic green sheet on which first or second internal electrode pattern is formed.

Figure 9:
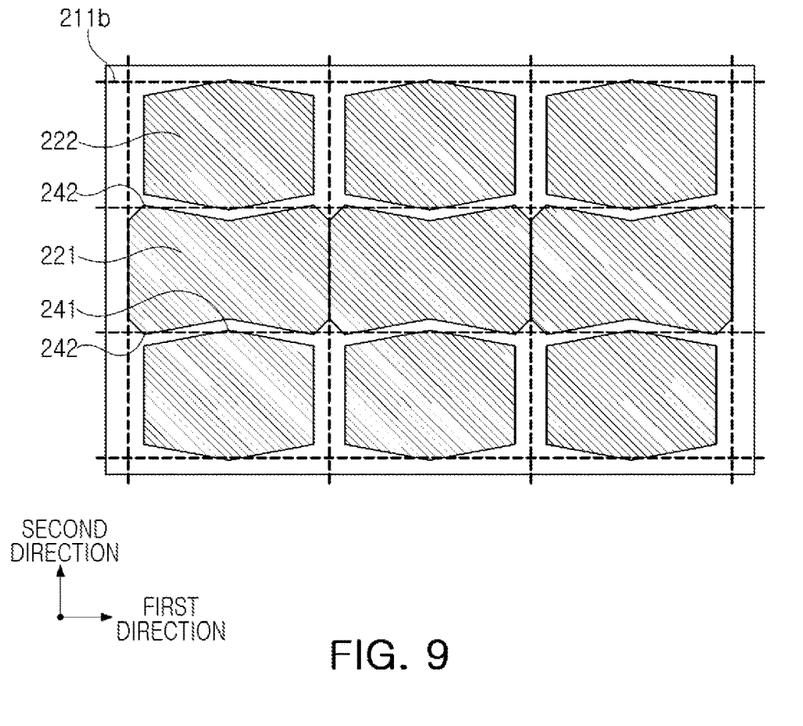
FIG. 9 schematically illustrates a second ceramic green sheet on which the first or second internal electrode pattern is formed.

FIG. 9 schematically illustrates a second ceramic green sheet on which the first or second internal electrode pattern is formed.

Referring to FIGS. 8 and 9, the description describes a method of forming the first dummy electrode 141a or 141b or the second dummy electrode 142a or 142b. The body 110 may be formed by alternately stacking first and second ceramic green sheets 211a and 211b on which first and second internal electrode patterns 221 and 222 are respectively formed on each other in the third direction. Here, as described above, the internal electrode pattern 221 or 222 may be formed by printing the conductive paste for an internal electrode on the ceramic green sheet 211a or 211b.

Here, the first internal electrode pattern 221 of the first ceramic green sheet 211a may be alternately disposed with the second internal electrode pattern 222 of the second ceramic green sheet 211b in the third direction, and the second internal electrode pattern 222 of the first ceramic green sheet 211a may be alternately disposed with the first internal electrode pattern 221 of the second ceramic green sheet 211b in the third direction. Here, a first dummy electrode pattern 241 and a second dummy electrode pattern 242 may be formed by cutting some regions of the first internal electrode pattern 221 and the second internal electrode pattern 222 in a process of stacking the plurality of first and second ceramic green sheets 211a and 211b and cutting the same into a unit capacitor of each component. It is then possible to form the body 110 including the dielectric layer 111 and the internal electrodes 121 and 122 by firing the cut capacitor, and to form the first dummy electrodes 141a and 141b and the second dummy electrodes 142a and 142b by sintering the first dummy electrode pattern 241 and the second dummy electrode pattern 242.

A multilayer electronic component 100 according to another exemplary embodiment of the present disclosure may include: a body 110 including dielectric layers 111 and first and second internal electrodes 121 and 122 stacked on each other in the third direction, while having the dielectric layer 111 interposed therebetween, and including first and second surfaces 1 and 2 opposing each other in the first direction, and third and fourth surfaces 3 and 4 opposing each other in the second direction; a pair of first external electrodes 131a and 131b respectively disposed on the first and second surfaces 1 and 2 of the body 110, extended onto the third and fourth surfaces 3 and 4 and connected to the first internal electrode 121; and second external electrodes 132a and 132b respectively disposed on the third and fourth surfaces 3 and 4 of the body 110 and connected to the second internal electrode 122. The first internal electrode 121 may include a first main portion 121a and a first lead portion 121b extended from the first main portion 121a in the second direction to be connected to the first external electrodes 131a and 131b, the second internal electrode 122 may include a second main portion 122a and a second lead portion 122b extended from the second main portion 122a in the second direction to be connected to the second external electrodes 132a and 132b, and the first and second lead portions 121b and 122b may overlap each other in at least some regions, in the third direction.

Referring to FIG. 7, not only an occurrence of the step difference may be reduced by at least some regions S where the first lead portion 121b and the second lead portion 122b overlap each other in the third direction, but also the capacitance of the multilayer electronic component 100 may be formed by each area of the regions S where the first lead portion 121b and the second lead portion 122b overlap each other in the third direction. In more detail, the first-A lead portion 121b1 and the second-A lead portion 122b1 may overlap each other in the at least some regions S in the third direction. In addition, the first-B lead portion 121b2 and the second-B lead portion 122b2 may overlap each other in the at least some regions S in the third direction. It is thus possible to maximize the capacitance formation in the body 110 of the same size.

The multilayer electronic component 100 according to another exemplary embodiment of the present disclosure may have the same configuration as the above-described configuration of the multilayer electronic component 100 according to an exemplary embodiment of the present disclosure. Therefore, omitted is a description overlapping the above-described description of an exemplary embodiment of the present disclosure.

As set forth above, the present disclosure may provide the multilayer electronic component having the lower equivalent series inductance (ESL).

The present disclosure may also provide the multilayer electronic component having the excellent reliability by suppressing the step difference from occurring in the margin portion.

The present disclosure may also provide the multilayer electronic component having the excellent capacitance due to the increased area in which the internal electrodes overlap each other.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes stacked on each other in a third direction of the body, while having the dielectric layer interposed therebetween, and including first and second surfaces opposing each other in a first direction of the body, and third and fourth surfaces opposing each other in a second direction of the body;
first external electrodes respectively disposed on the first and second surfaces of the body, extended onto the third and fourth surfaces and connected to the first internal electrode; and
second external electrodes respectively disposed on the third and fourth surfaces of the body and connected to the second internal electrode,
wherein the first internal electrode includes a first main portion and first lead portions respectively extended from the first main portion in the second direction to be connected to the first external electrodes, the first lead portions having (i) a length in the first direction increased in a direction towards the first main portion, (ii) a first edge inclined at a first angle with respect to an edge of the first main portion, and (iii) a second edge inclined at a second angle with respect to the edge of the first main portion, where the first angle is different from the second angle, and
the second internal electrode includes a second main portion and second lead portions respectively extended from the second main portion in the second direction and a direction opposite to the second direction to be connected to the second external electrodes and having a length in the first direction increased in a direction towards the second main portion.

2. The multilayer electronic component of claim 1, wherein the first and second lead portions overlap each other in at least some regions, in the third direction.

3. The multilayer electronic component of claim 1, wherein at least some regions of the first main portion do not overlap the second main portion in the third direction.

4. The multilayer electronic component of claim 1, wherein a pair of the first lead portions are positioned on one side of the first main portion to respectively be connected to the first external electrodes.

5. The multilayer electronic component of claim 1, wherein one end of at least one of the second lead portions, connected to the second main portion, has the length in the first direction, substantially the same as the length of the second main portion in the first direction.

6. The multilayer electronic component of claim 1, further comprising first dummy electrodes respectively connected to the second external electrodes and spaced apart from the first external electrodes.

7. The multilayer electronic component of claim 6, wherein at least one of the first dummy electrodes is disposed on substantially the same plane as the first internal electrode.

8. The multilayer electronic component of claim 6, wherein at least one of the first dummy electrodes has a length in the first direction increased in a direction towards the second external electrode.

9. The multilayer electronic component of claim 1, further comprising second dummy electrodes respectively connected to the first external electrodes and spaced apart from the second external electrodes.

10. The multilayer electronic component of claim 9, wherein at least one of the second dummy electrodes is disposed on substantially the same plane as the second internal electrode.

11. The multilayer electronic component of claim 9, wherein at least one of the second dummy electrodes has a length in the first direction increased in a direction towards the first external electrode.

12. The multilayer electronic component of claim 1, wherein the first main portion extends to the first and second surfaces of the body to be connected to the first external electrodes.

13. A multilayer electronic component comprising:
a body including a dielectric layer and first and second internal electrodes stacked on each other in a third direction of the body, while having the dielectric layer interposed therebetween, and including first and second surfaces opposing each other in a first direction of the body, and third and fourth surfaces opposing each other in a second direction of the body;
first external electrodes respectively disposed on the first and second surfaces of the body, extended onto the third and fourth surfaces and connected to the first internal electrode; and
second external electrodes respectively disposed on the third and fourth surfaces of the body and connected to the second internal electrode,
wherein the first internal electrode includes a first main portion and first lead portions respectively extended from the first main portion in the second direction to be connected to the first external electrodes, the first lead portions having a first edge inclined at a first angle with respect to an edge of the first main portion, and a second edge inclined at a second angle with respect to the edge of the first main portion, where the first angle is different from the second angle,
the second internal electrode includes a second main portion and second lead portion respectively extended from the second main portion in the second direction and a direction opposite to the second direction to be connected to the second external electrodes, and
the first and second lead portions overlap each other in at least some regions, in the third direction.

14. The multilayer electronic component of claim 13, wherein at least some regions of the first main portion do not overlap the second main portion in the third direction.

15. The multilayer electronic component of claim 13, wherein a pair of the first lead portions are positioned on one side of the first main portion to respectively be connected to the first external electrodes.

16. The multilayer electronic component of claim 13, one end of one of the second lead portions, connected to the second main portion, has the length in the first direction, substantially the same as the length of the second main portion in the first direction.

17. The multilayer electronic component of claim 13, further comprising first dummy electrodes respectively connected to the second external electrodes and spaced apart from the first external electrodes.

18. The multilayer electronic component of claim 17, wherein at least one of the first dummy electrodes is disposed on substantially the same plane as the first internal electrode.

19. The multilayer electronic component of claim 17, wherein at least one of the first dummy electrodes has a length in the first direction increased in a direction towards the second external electrode.

20. The multilayer electronic component of claim 13, further comprising second dummy electrodes respectively connected to the first external electrodes and spaced apart from the second external electrodes.

21. The multilayer electronic component of claim 20, wherein at least one of the second dummy electrodes is disposed on substantially the same plane as the second internal electrode.

22. The multilayer electronic component of claim 20, wherein at least one of the second dummy electrodes has a length in the first direction increased in a direction towards the first external electrode.

23. The multilayer electronic component of claim 13, wherein the first main portion extends to the first and second surfaces of the body to be connected to the first external electrodes.

* * * * *